United States Patent [19]

Hornby et al.

[11] Patent Number: 4,817,059
[45] Date of Patent: Mar. 28, 1989

[54] BOREHOLE LOGGING METHODS FOR DETECTION AND IMAGING OF FORMATION STRUCTURAL FEATURES

[75] Inventors: Brian E. Hornby; Ralphe Wiggins, both of Ridgefield, Conn.

[73] Assignee: Schlumberger Technology Corporation, New York, N.Y.

[21] Appl. No.: 67,677

[22] Filed: Jun. 26, 1987

[51] Int. Cl.⁴ .............................................. G01V 1/40
[52] U.S. Cl. ....................................... 367/28; 367/25; 367/34
[58] Field of Search .................... 367/30, 9, 69, 73, 25, 367/57, 27, 28, 31, 33, 53, 54; 181/102

[56] References Cited

U.S. PATENT DOCUMENTS

| | | | |
|---|---|---|---|
| 3,353,151 | 0/1967 | Rockwell | 367/38 |
| 3,483,505 | 12/1969 | Adair et al. | 367/31 |
| 4,214,226 | 7/1980 | Narasimhan et al. | 367/57 |
| 4,293,933 | 10/1981 | Park et al. | 367/73 |
| 4,295,542 | 10/1981 | Reeves et al. | 367/56 |
| 4,298,967 | 11/1981 | Hawkins | 367/25 |
| 4,468,623 | 0/1984 | Gianzero | 324/367 |
| 4,594,691 | 6/1986 | Kimball et al. | 367/30 |
| 4,611,312 | 9/1986 | Ikeda | 367/38 |
| 4,627,036 | 12/1986 | Wyatt | 367/57 |
| 4,672,588 | 6/1987 | Willen | 367/30 |

FOREIGN PATENT DOCUMENTS 2598817 5/1986 France.

OTHER PUBLICATIONS

J. P. Lindsey & Al Herman, *Digital Migration*; reprinted from Oil and Gas Journal, 38, 112–115.
D. W. Rockwell, *Migration Stack Aids Interpretation*, reprinted from Oil and Gas Journal, 68, 202–218.

Primary Examiner—Thomas H. Tarcza
Assistant Examiner—Ian J. Lobo
Attorney, Agent, or Firm—Clifford L. Tager; David G. Coker; Keith G. W. Smith

[57] ABSTRACT

Waveform data obtained in a borehole by a tool having a sonic source and an array of sonic detectors is analyzed to obtain an image of formation features within several tens of feet of the borehole, such as fractures, bed boundaries and other boreholes. A value of background sonic slowness is derived from the data and used to determine the sonic energy transit time from the source to each detector via each point in a grid of points extending into the formation and along the borehole. The time for a particular detector/point pair is used to extract the amplitude of the waveform from that detector at that time relative to operation of the source. Such amplitudes for the same point and for different detectors and tool positions are cumulated. The final values for all points are plotted as a variable density display which provides the desired image.

16 Claims, 7 Drawing Sheets

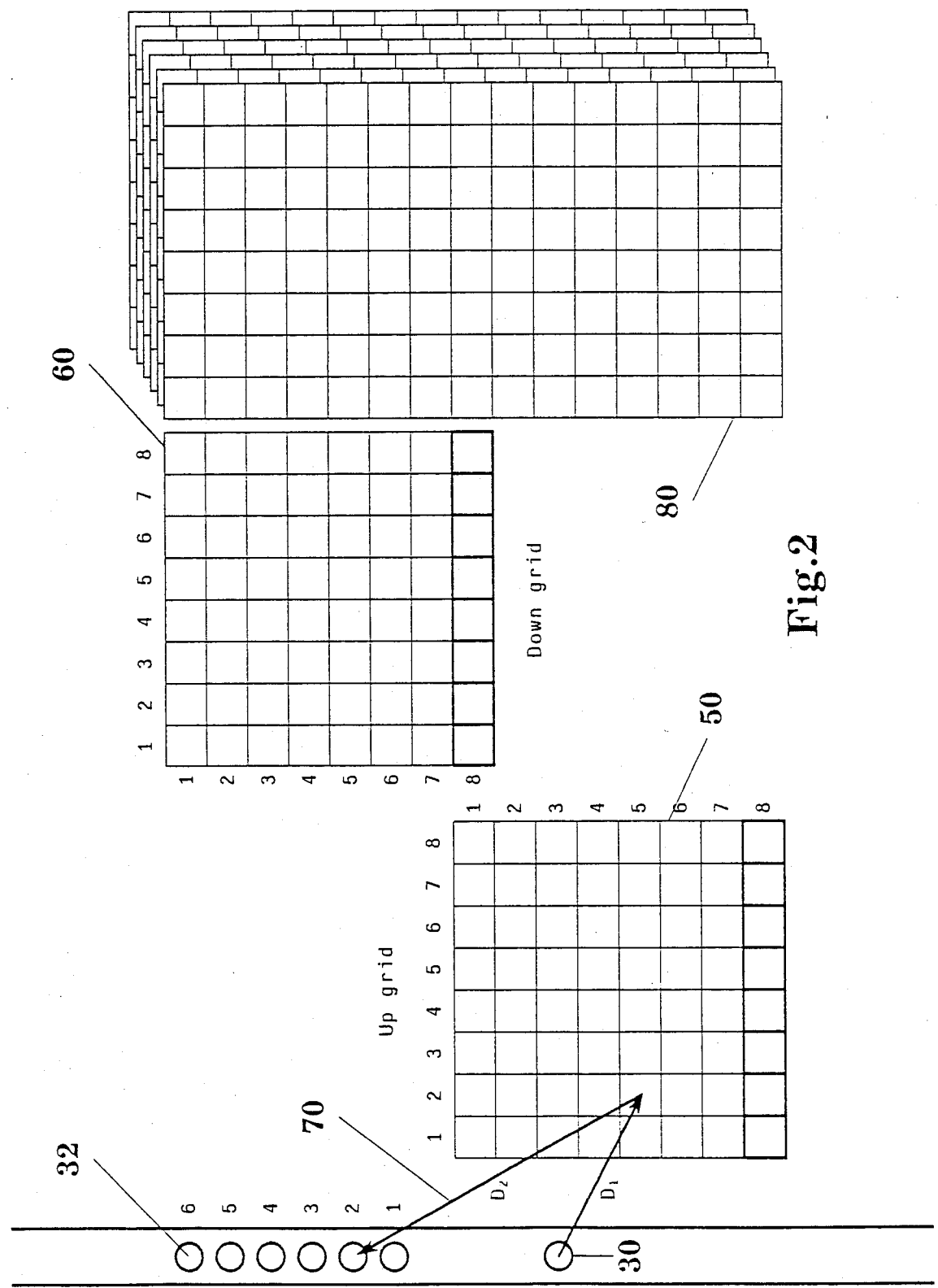

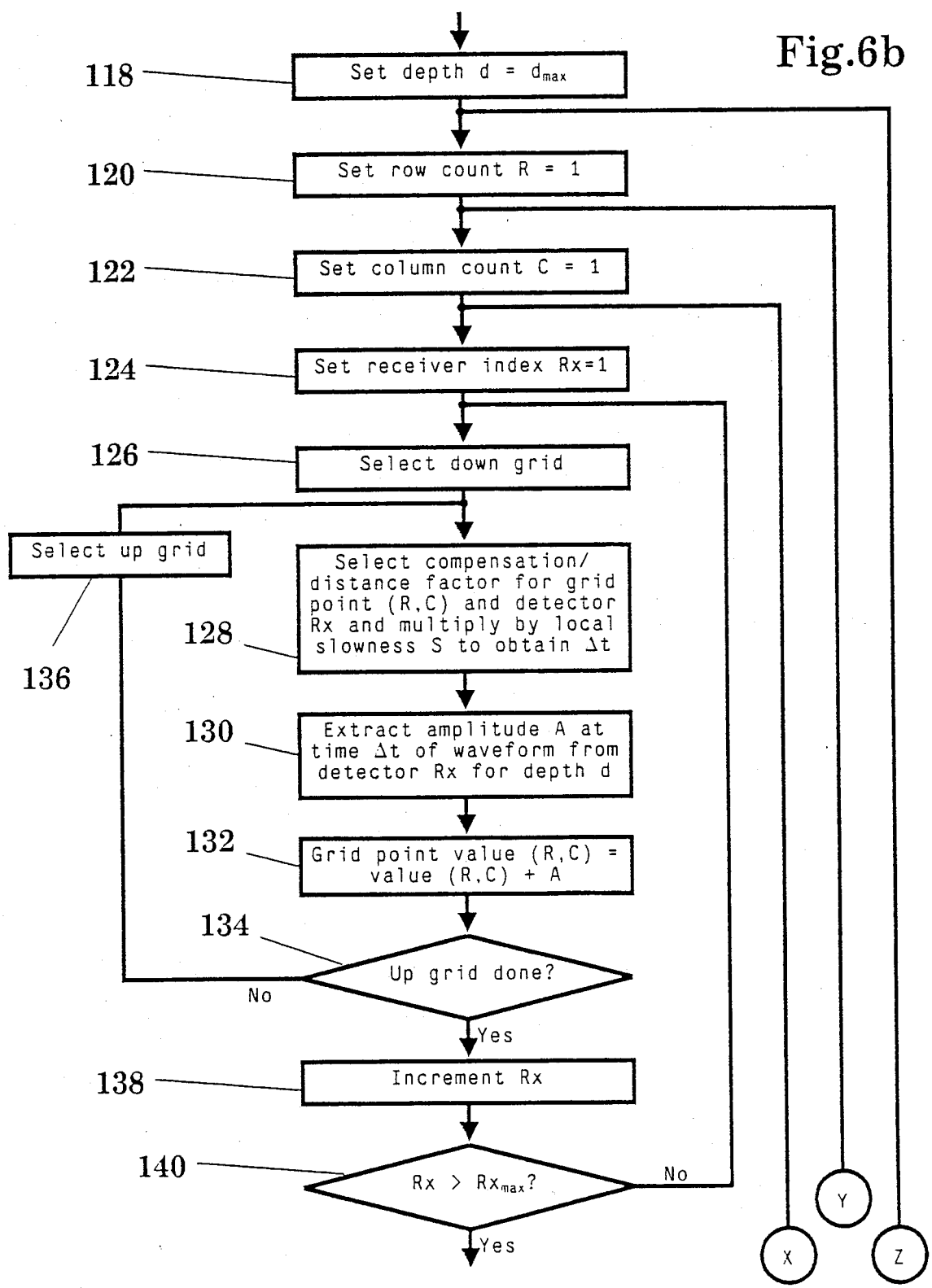

BOREHOLE LOGGING METHODS FOR DETECTION AND IMAGING OF FORMATION STRUCTURAL FEATURES

BACKGROUND OF THE INVENTION

This invention relates to methods for investigation of an earth formation in the vicinity of a borehole traversing the formation, using measurements obtained by means of a borehole logging operation.

The exploration for a production of subsurface reserves of raw materials such as hydrocarbons involves a variety of techniques for finding possible locations for such reserves and for detecting and assessing them. Thus seismic techniques may be used for initial survey work and borehole logging techniques for detection. Seismic data, obtained by energizing a source and recording sound waves propagating from the source to a multiplicity of detectors, is typically processed to generate an image (or seismic section) of a cross-section of the formation being investigated. A seismic image can be reviewed to identify formation structures likely to harbour hydrocarbons and thus determine suitable locations for drilling of exploration boreholes. One technique for producing such an image is described in a paper 'Migration Stack aids interpretation', by D. W. Rockwell, Oil and Gas Journal, 1971, vol. 69, pp. 202–218, and in U.S. Pat. No. 3,353,151. However, this technique is described solely in the context of analysis of relatively low-frequency seismic signals in circumstances free of noise arising from sonic energy propagation through borehole fluids, and in the context of a relatively simple geometry in which the formation being investigated extends solely to one side of the line connecting the source and detectors.

After a borehole has been drilled certain borehole logging tools, such as the multiple-transducer device described in U.S. Pat. No. 4,468,623, can be used to obtain measurement signals from within a borehole which can be processed to generate images representative of formation structures intersected by the borehole. However, seismic techniques tend to yield relatively low resolution images of large formation sections, whereas the borehole images provide relatively very high resolution images restricted solely to the borehole wall.

There remains a need for images which extend into the formation from the borehole and provide information on the structures in the vicinity of the borehole with at least moderate resolution, irrespective of whether the structures actually intersect the borehole. Such images would be a valuable complement to conventional seismic images of such structures as salt domes. They could yield information on fractures in the vicinity of the borehole but not actually intersecting it, which would be of great value in planning completion and production operations for extraction of hydrocarbons. Likewise the position of an oil-gas interface in a reservoir could be monitored. These images would also assist drilling of relief boreholes to help stop a blow-out of a nearby borehole.

Recently interest has been growing in relation to the possibility of drilling of high-angle or even horizontal extended-reach holes out from a conventional borehole into horizontal oil-bearing strata intersected by the borehole. Such a technique creates a need for accurate information on the position of the drainage well relative to the upper and lower boundaries of the oil-bearing stratum (typically a few tens of meters thick). During production from such a drainage well it may also be necessary to monitor the position of any gas which may be expanding in volume as oil is withdrawn and thus approaching the well. Moderate resolution images of the vicinity of the borehole and the drainage well would clearly be of great utility in these circumstances.

It is an object of this invention to provide a method, using measurements obtained in a borehole traversing an earth formation, for detection and imaging of features of the formation in the vicinity of the borehole, such as fractures, other boreholes and boundaries between different constituents of the formation.

SUMMARY OF THE INVENTION

According to one aspect of this invention there is provided a method of generating an image of structural features of an earth formation in the vicinity of a borehole traversing the formation. A plurality of sets of waveforms are obtained from a sonic investigation of the formation relative to a plurality of locations in the borehole, typically using an apparatus having a sonic source and an array of sonic detectors for receiving and recording waveforms simultaneously for a multiplicity of positions spaced along the borehole each time the source is energized. The formation is considered in terms of a grid of points which extends into the formation and along the borehole in the vicinity of the investigation locations. The travel time for sonic energy represented in the waveforms and propagating via each of these points is derived, for example by estimation based on the length of the propagation path and the local sonic energy slowness. The amplitudes of a plurality of the waveforms are determined in accordance with this derived travel time and cumulated for each point. A tangible record of the cumulated amplitudes as a function of position of the points in the formation is produced to provide the desired image.

According to another aspect of the invention a method of generating an image of structural features of an earth formation in the vicinity of a borehole traversing the formation comprises the steps of obtaining a plurality of sets of waveforms, each set comprising a plurality of waveforms from a sonic investigation of the formation relative to a respective common location in the borehole; deriving, for each set and for each of a plurality of respective and different radii from the borehole, a travel time for sonic energy represented in the waveforms and propagating via points in the formation at the respective radius and at depths in the vicinity of the location respective to that set; determining for each point and each set the amplitude of each waveform in that set at the corresponding derived travel time and cumulating such amplitudes from the waveforms for that point; and producing a tangible record of the cumulated amplitudes as a function of depth and radius.

BRIEF DESCRIPTION OF THE DRAWINGS

Additional objects and features of the invention will become more apparent upon consideration of the following detailed description of the invention, reference being had to the accompanying drawings in which:

FIG. 2 illustrates graphically certain aspects of the method described herein;

FIGS. 6a to 6c show a flow diagram of a method for imaging formation features in accordance with this invention;

DETAILED DESCRIPTION

Figure 1:
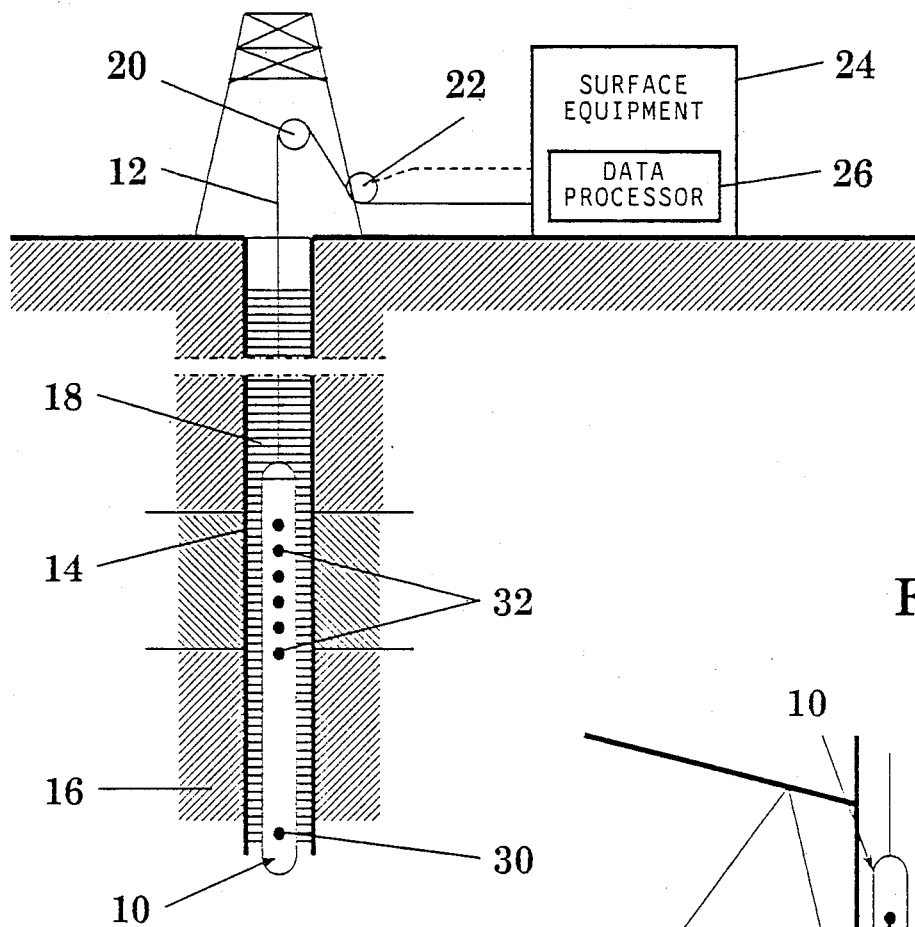
FIG. 1 is a schematic diagram of a borehole logging operation using a tool having an array of detectors for collecting data for use in accordance with this invention.

Referring to FIG. 1, an elongate logging tool or sonde 10 is suspended on an armored communication cable 12 in a borehole 14 penetrating an earth formation 16. The borehole 14 is filled with liquid 18 such as drilling mud used to stabilize the borehole wall and prevent escape of formation fluids up the borehole. The tool 10 is moved in the borehole 14 by paying the cable 12 out and reeling it back in over a sheave wheel 20 and a depth gauge 22 by means of a winch forming part of a surface equipment 24. Usually the logging measurements are actually made while the tool 10 is being raised back up the borehole 14, although in certain circumstances they may additionally or alternatively be made on the way down. The depth gauge 22 measures displacement of the cable 12 over the sheave wheel 20 and thus the depth of the tool 10 in the borehole 14.

The tool 10 is generally as described in U.S. Pat. No. 4,594,691 to Kimball et al and assigned to the assignee hereof. In particular, the tool includes a sonic source 30 and an array of sonic detectors 32 spaced along the tool and separated from the source 30. The number of detectors is typically between six and twelve. As the tool 10 is drawn up the borehole 14 the source 30 is operated repetitively to cause propagation of sonic energy through the borehole 14 and the surrounding formation 16 to the detectors 32. Electrical waveform signals generated by the detectors 32 and representative of the received sonic energy waveforms are sampled and digitized. These digitized signals are suitably conditioned by processing and interface circuitry in the tool 10 and transmitted up the cable 12 to the surface equipment 24. This equipment typically receives, decodes, amplifies and records the signals on chart and/or magnetic tape recorders as a function of the depth signals generated by the depth gauge 22. In addition the equipment 24 may, as described below, analyze the data represented by these signals to yield indications of fractures which are also recorded. Further processing of these and other signals from the tool 10 enables the surface equipment 24 to monitor the operation of the tool 10 and generate signals which are transmitted down the cable 12 to control the tool 10, for example to synchronize the operation of its component circuits or modify circuit parameters such as amplifier gain.

The interval between successive operations of the source 30 is chosen in part to allow recording of waveforms of sufficient duration to include all components of interest before arrival of energy resulting from the next successive operation of the source 30. These components are the arrivals resulting from scattering of sonic energy back from the formation 16 towards the tool 10. It is desired to distinguish these back-scattered arrivals both from direct compressional and shear wave arrivals arising from propagation of sonic energy directly along the borehole, and from components of the waveforms corresponding to tube waves (low-frequency Stoneley waves).

Tube wave components are generally lower in frequency than the desired arrivals, so they can be removed from the waveforms by filtering with a high-pass filter. The unwanted direct arrivals can be avoided in either of two ways: preferably the duration of signal acquisition is set long enough (for example at least 20 ms) that the direct arrivals will not be present in the latter part of the waveforms, and only this latter part of the waveforms is used in later analysis; alternatively, if only a relatively short acquisition time is possible, a velocity filter may be used to separate the direct arrivals from the required back-scattered arrivals.

Another factor influencing the duration of signal acquisition is the quality of image produced and the distance to which the image extends into the formation away from the borehole. As will be explained hereinafter, a longer acquisition time will generally provide a higher quality image extending over a larger portion of the formation.

The rate of operation of the source 30 will also depend on the rate at which the tool 10 is drawn up the borehole 14 and the desired distance between tool positions at which measurements are to be made. Thus for a measurement spacing of six inches (15.24 cm) at a logging speed of 1800 feet (548.4 m) per hour, one trigger pulse per second suffices. A typical maximum trigger pulse rate is ten pulses per second. It is desirable that the measurement spacing equal the spacing between detectors 32 (or a submultiple of that spacing), by arranging that successive source operations occur after the tool 10 has moved a distance equal to the detector spacing (or the required sub-multiple thereof), since this allows the use of analytical techniques which take advantage of the multiple redundant measurements obtainable with an array of detectors.

The frequency of the sonic energy generated by the source 30 is determined in part in accordance with the smallest features it is desired to resolve in the formation 16. Thus, to resolve features down to two feet ($\simeq$60 cm) in size, a wavelength of no more than four feet ($\simeq$1.2 m) would be used. For a formation slowness of 70 $\mu$s/ft ($\simeq$230 $\mu$s/m) this corresponds to a minimum source frequency of approximately 3.5 kHz.

The downhole equipment may include other tools in addition to the tool 10, such as a caliper device for measuring borehole diameter.

The surface equipment 24 typically incorporates a data processor 26 for coordinating and controlling the logging operation, and this processor may also be used for analysis of the recorded waveforms at the wellsite. Alternatively or in addition, the waveform recordings may be transferred to a remote location for subsequent more detailed analysis. In either case the analysis may proceed in the manner described below. It will be understood by those skilled in the art that this analysis can be implemented, for example, by appropriate programming of a general purpose digital computer or by means of special purpose electronic circuitry.

The analysis involves cumulating waveform sample amplitudes for points in the formation in the vicinity of the borehole 14. The locations of these points are defined by a grid lying in a plane containing the borehole axis, as shown in FIG. 2. The spacing between grid points in the direction parallel to the borehole axis is essentially arbitrary, although it may conveniently equal the measurement spacing, thereby significantly simplifying the computations required for the analysis. The grid point spacing transverse to the borehole axis is preferably equal to the spacing parallel to the axis, or equal to a sub-multiple of that spacing. Thus, in the case of a six-inch (15.24 cm) spacing between detectors 32, the grid point spacing may be six inches (15.24 cm) parallel to the borehole axis and three inches (7.62 cm) transverse to that axis. The grid is preferably square (in terms of spatial extent), and its useful size in both directions is primarily determined by the duration of acquisition of each waveform from the detectors 32 and by the sonic slowness (inverse of velocity) of the formation 16. Thus for an acquisition time of 20 ms and a formation having a slowness of the order of 70 $\mu s/ft$ ($\approx 230$ $\mu s/m$), the grid could be up to 100 feet ($\approx 30$ m) on each side, giving a total of 201 rows and 401 columns.

Figure 3:
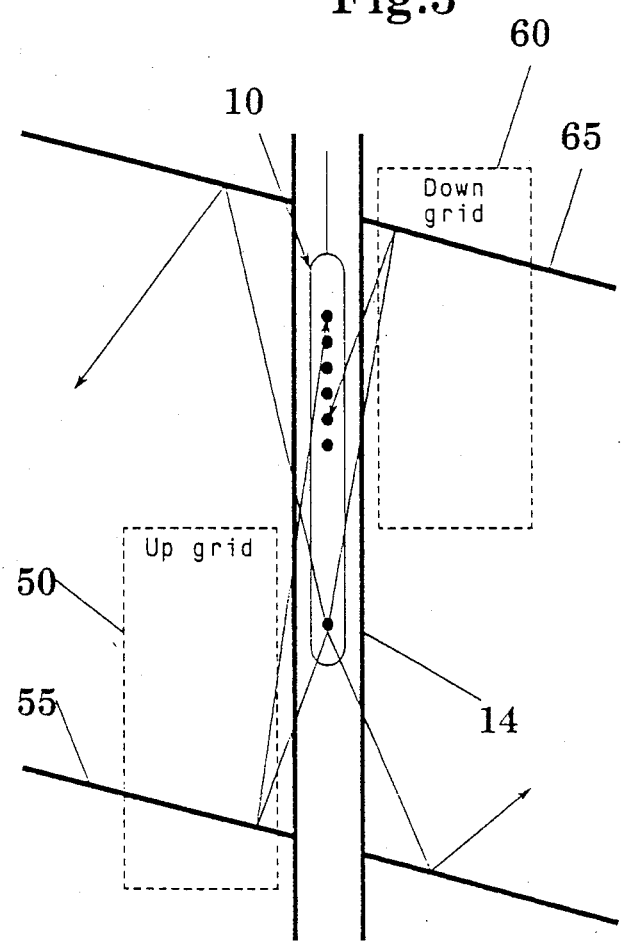
FIG. 3 is a schematic diagram illustrating the geometrical relationship between tool position, formation structure and grids used in the method described herein.

The position of the grid in the formation 16 relative to the tool 10 has a selective effect, as a function of dip or inclination, on the features which appear in the output image. As illustrated in FIG. 3, a grid 50 extending downwards from a point between the source 30 and the detectors 32, away from the detectors 32, will cumulate waveform components resulting only from scattering of sonic energy back from features dipping upwards (as viewed from the borehole), such as bed boundary 55. Conversely, a grid 60 extending upwards from that point, towards and past the detectors 32, will cumulate waveform components resulting only from scattering of sonic energy back from features dipping downwards (as viewed from the borehole), such as bed boundary 65. Preferably values are cumulated for points in the formation in both grid positions, to provide two images of upwardly and downwardly dipping features respectively. As illustrated in FIG. 2 the cumulation of values can be performed for both grids in one operation. It should be noted that the 'down' grid 60 in FIG. 2 is shown to one side of the 'up' grid 50 solely for clarity, and in fact is offset from the borehole 14 by the same distance as the grid 50.

Waveform sample amplitudes may be extracted and cumulated for grid points in any sequence, provided that waveforms for a given tool position are not included in cumulations for grid points above the grid 50 or below the grid 60 for that tool position. However, it is convenient for the grids in effect to be moved upwards through the formation, tracking the upward movement of the tool 10 while the waveforms are obtained. The waveforms for a given tool position are used to update the cumulated amplitudes for the points defined by the grids, as explained hereinafter. When all waveforms and grid points have been processed for that tool position, the cumulated values are notionally moved down one row in each grid, corresponding to movement of the tool and the grids up to the next tool position. The cumulated values for the bottom rows of the grids before the move constitute output signals that are recorded to form the desired images.

The amplitudes cumulated for the points in the grids 50 and 60 are derived from the waveforms in accordance with the travel time for sonic energy propagating from the source 30 to the detectors 32 via scattering at each grid point. This time is in turn dependent on the slowness $\Delta t$ of sonic energy and the length of the path traversed by the scattered energy. One exemplary path, extending from the source 30 via a grid point having coordinates (row R=5, column C=2) in the up grid 50 to the second detector 32, is shown at 70 in FIG. 2. For a grid spacing equal to the spacing between measurement locations, this path length ($D_1+D_2$) is fixed for any given combination of detector and grid point, and thus can be determined in advance and stored for use during the analysis. For each grid point there will of course be as many predetermined path lengths as there are detectors 32 in the tool 10. An $r \times c \times n$ matrix 80 to the right-hand side of FIG. 2 represents the complete set of path lengths as determined and stored in this manner, r being the number of rows in the grids 50 and 60, c the number of columns and n the number of detectors in the tool 10.

The cumulation of values for the grid points at different distances x from the borehole 14 along a row can be described in principle by the following relationship:

$$f(x) = \Sigma_{S,R} U(r,t) \quad (1)$$

where $U(r,t)$ is the amplitude of a waveform from detector r at time $t = \Delta t \times (D_1+D_2)$ and $\Sigma_{S,R}$ indicates summation over all combinations of source and detector positions.

Figure 4:
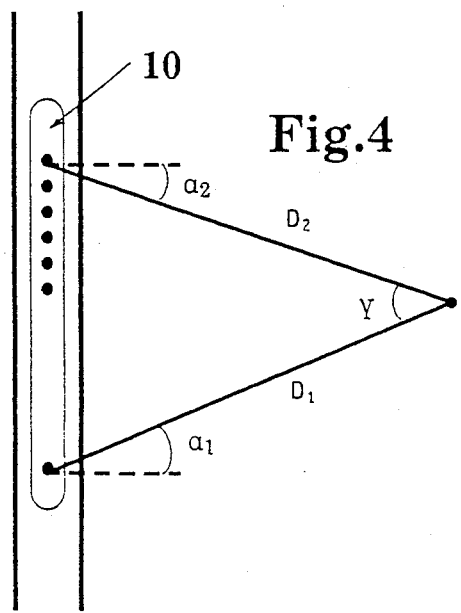
FIG. 4 is a diagram illustrating various angles referred to herein.

Preferably, however, the amplitude values to be cumulated are first compensated for perturbations arising from geometrical effects across the grids 50 and 60. Thus the angle of incidence of the propagation path at the grid point and the angle of scattering back from the grid point both have an effect which can be evaluated. Likewise the angle of propagation from the source 30 and the angle of incidence at the detector 32 affect the coupling of sonic energy and thus the amplitude of the received signal. Additionally geometric spreading losses can be corrected by compensating for variations in the path lengths $D_1$ and $D_2$. The relationship (1) thus modified to incorporate all these compensations becomes $$f(x) = \Sigma_{S,R} W(\alpha_1,\alpha_2,\gamma) D_1 D_2 C(\alpha_1) C(\alpha_2) U(r,t) \quad (2)$$

where $W(\alpha_1,\alpha_2,\gamma) = (1+\cos \gamma) \times \cos \alpha_1 \times \cos \alpha_2$, $\alpha_1$ is the angle of propagation from the source, $\alpha_2$ is the angle of incidence at the detector and $\gamma$ is the included angle between the two parts of the propagation path at the grid point (see FIG. 4); and $C(\alpha_1)$ and $C(\alpha_2)$ are factors representing the coupling of sonic energy with the source and detector.

The coupling factors $C(\alpha_1)$ and $C(\alpha_2)$ can both be derived from an expression relating the angle of the propagation path of an elastic wave as it intersects the borehole to the magnitude p of the (pressure) signal measured by the detector. This expression for an incident compressional wave at the low frequency limit is $$p \propto (1 - 2(\Delta t_c/\Delta t_s)^2 \cos^2\alpha)/(1 - (\Delta t_c/\Delta t_{St})^2 \cos^2\alpha) \quad (3)$$

where $\Delta t_c$ is the formation compressional wave slowness;
$\Delta t_s$ is the formation shear wave slowness;
$\alpha$ is the angle $\alpha_1$ or $\alpha_2$;
$\Delta t_{St}$ is the Stoneley wave slowness, $= \rho(1/N + 1/K_m)$;
$\rho$ is the formation bulk density;
N is the formation shear modulus $\rho/\Delta t_s$;
$K_m$ is the borehole fluid bulk modulus $\rho_f/\Delta t_f^2$;

$\rho_f$ is the borehole fluid density; and
$\Delta t_f$ is the borehole fluid slowness.

Figure 5:
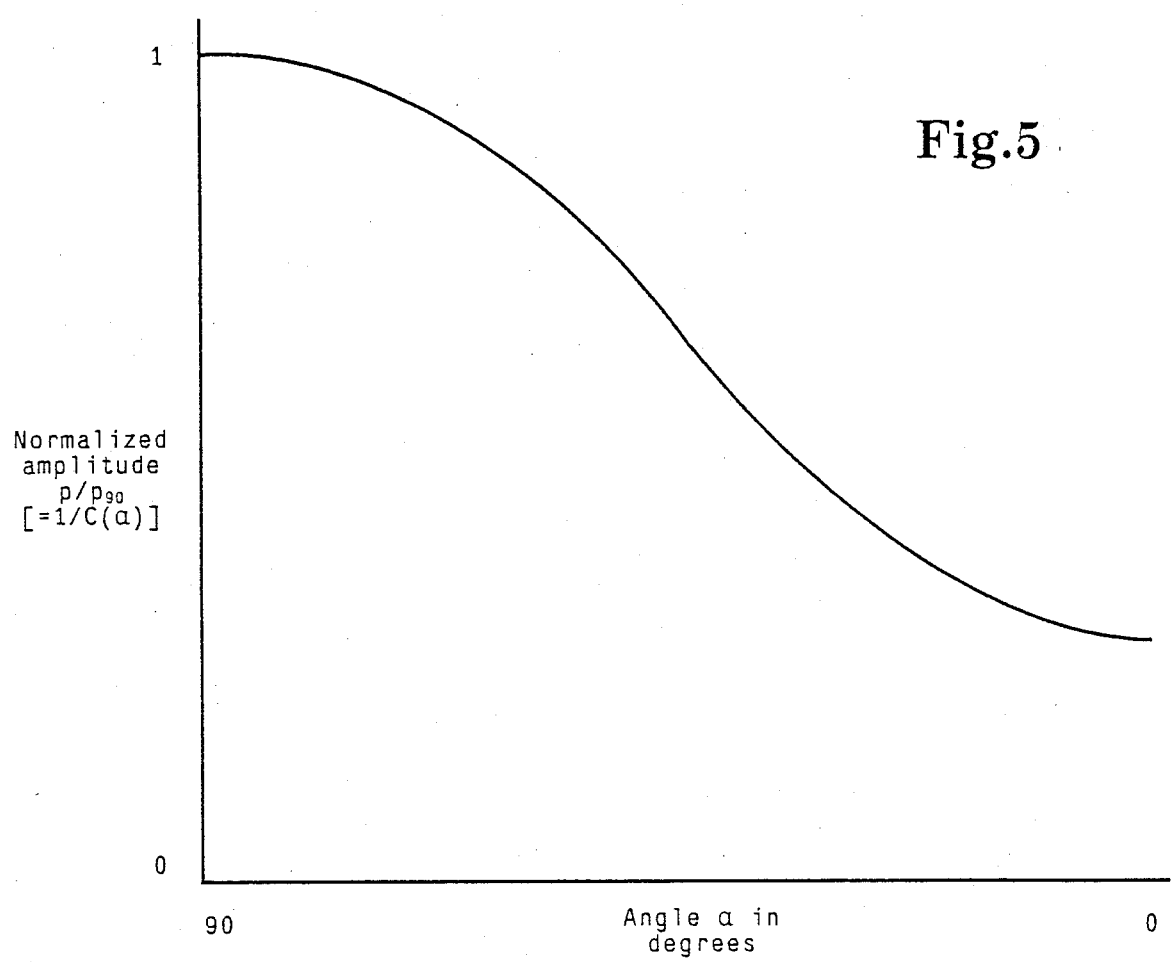
FIG. 5 is a graph of variation of sonic pressure in a borehole as a function of direction of propagation of sonic energy relative to a transducer in the borehole.

Expression (3) can be evaluated for a range of values of angle $\alpha$, and for specific values of overall slowness and density. Typically these slowness and density values may be taken as being constant over the length of an interval of interest in the borehole 14. The formation and Stoneley slowness values can be obtained from preliminary analysis of measurements made with the tool 10, the formation density can likewise be obtained by means of other borehole logging measurements (such as with a gamma-ray tool), and the borehole fluid properties can be found from analysis of fluid samples. FIG. 5 illustrates graphically an example of the variation of expression (3) with angle $\alpha$, the pressure amplitude $\rho$ being normalized relative to its value $\rho_{90}$ for an angle of propagation/incidence of 90°. For any given angle $\alpha$ the coupling factor $C(\alpha)$ is set equal to the reciprocal of the normalized amplitude derived from expression (3).

If the slowness and density values in expression (3) do not vary significantly about the mean values over the interval of the formation to be imaged, these mean values can be used as constant approximations to the actual values. The three compensations incorporated in equation (2) are then effectively all geometrical and they are, like the total path length $(D_1+D_2)$, fixed for any particular combination of grid point and detector. Accordingly they may also be evaluated in advance and combined with the path length values for storage in the matrix 80.

The steps in the analysis to produce the desired image will now be described with reference to FIGS. 6a to 6c. Those skilled in the art will recognize that the described storage and cumulation of values for the points in the grids 50 and 60 can conveniently be implemented in a computer program in terms of the concept of a two-dimensional 'array' of numbers (to be distinguished from the physical array of detectors 32 in the tool 10). For the sake of clarity and generality the following description will refer to values corresponding to the points in each grid.

Figure 6A:
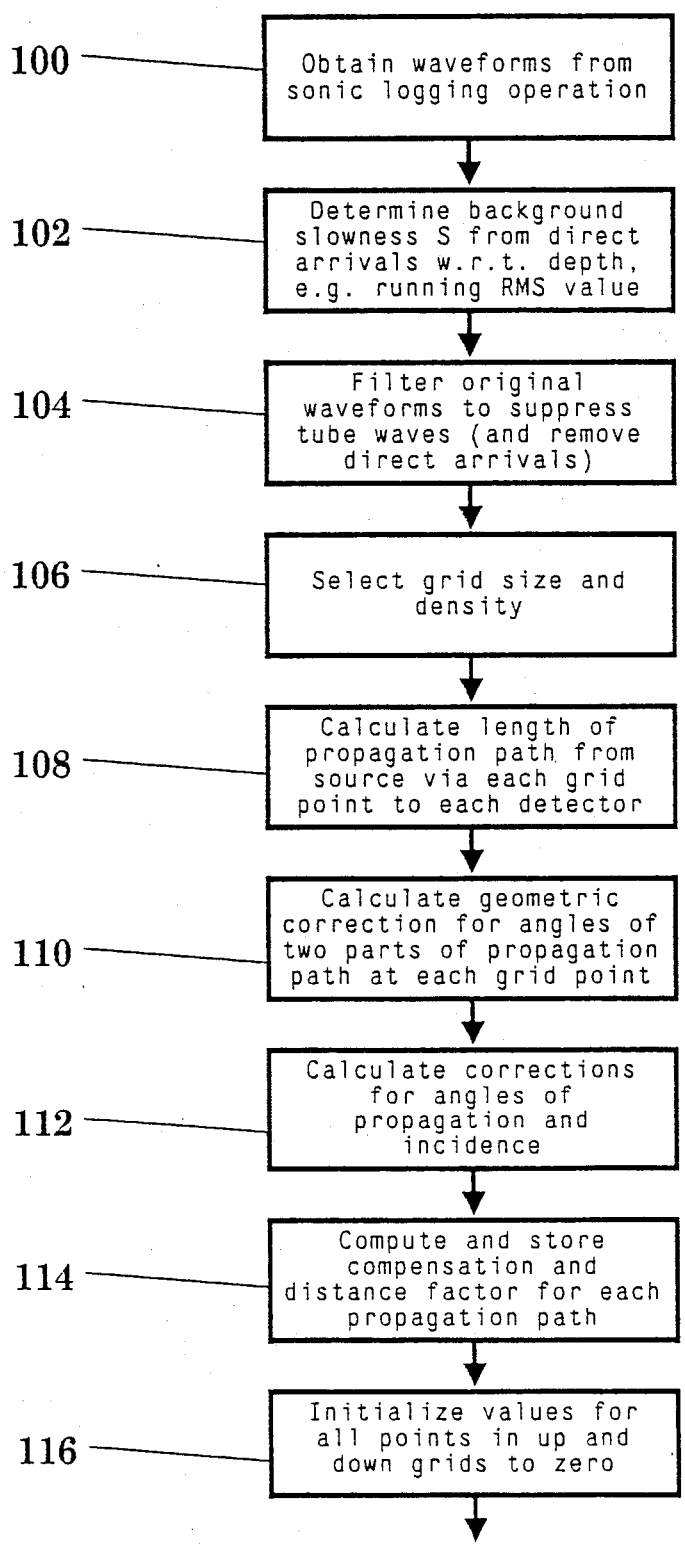
Figure 6C:
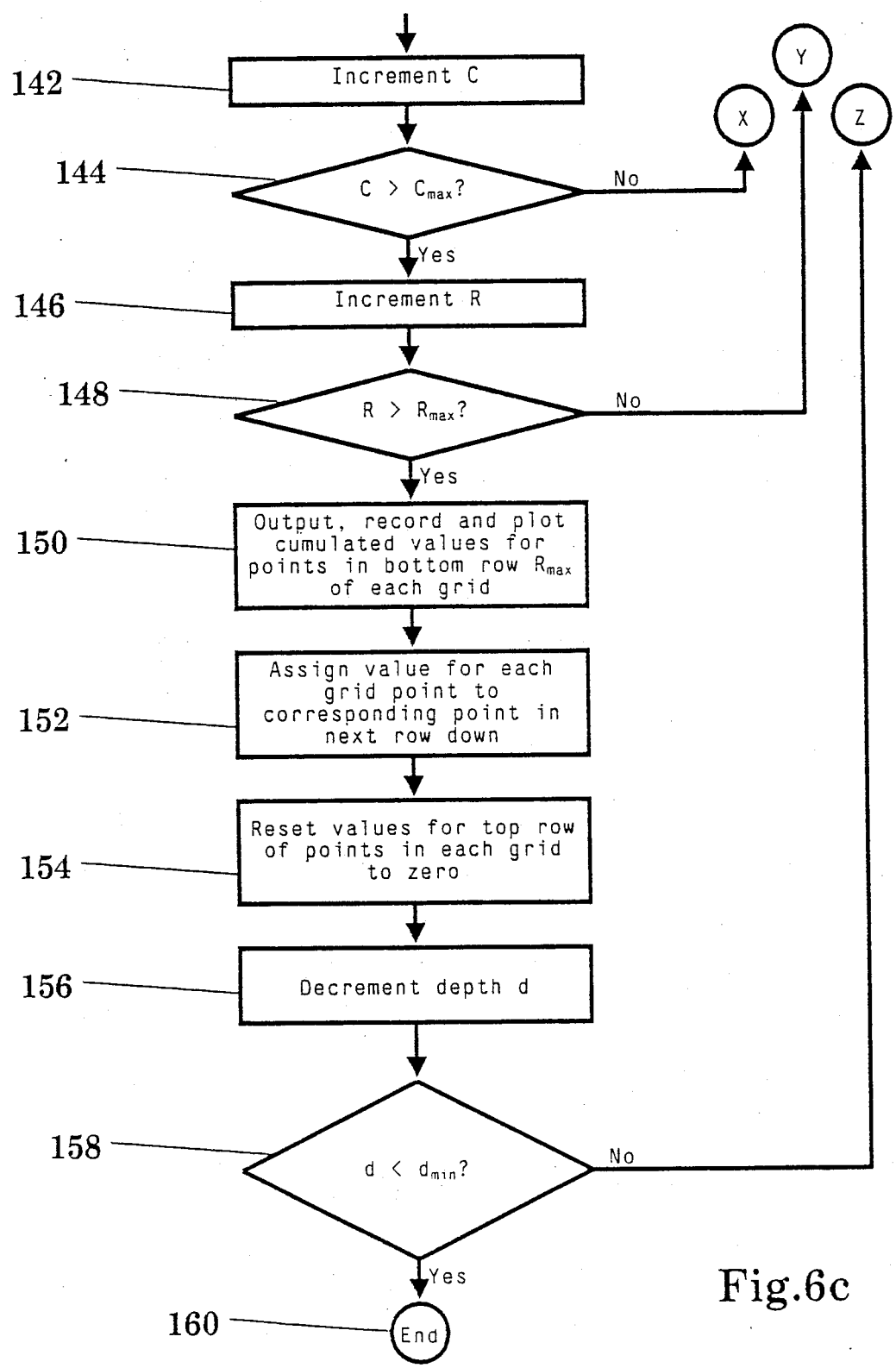

Referring to FIG. 6a, at step 100 waveforms are obtained from the detectors 32 during a sonic logging operation and recorded as described above. At step 102 these original waveforms are analyzed to obtain from the direct sonic arrivals therein an overall or background value for the slowness S of the formation as a function of depth. This may be accomplished for example using the multiple-shot processing technique described in U.S. Pat. No. 4,543,648. Such a method typically provides a value of slowness for each position of the tool 10 at which waveforms were recorded. However the variation of slowness with depth is generally not required to this degree of resolution for the imaging technique described herein. Accordingly if the depth range of the formation interval to be imaged is less than the depth range over which the grids 50 and 60 extend, the slowness values obtained for each tool position within that interval may simply be averaged to provide a single background slowness value S to be used in the subsequent analysis. The average may be derived as the mean of the values obtained, or for example as the root mean square of those values. Where the formation interval to be investigated extends over a greater depth range than the grids 50 and 60, the background slowness may be obtained as a running root mean square of the slownesses derived for the tool positions currently within the depth range of the grids 50 and 60. As well as the value of slowness (for example the compressional slowness $A\Delta t_c$) required for calculating sonic energy travel times, values are obtained at step 102 for the shear slowness $\Delta t_s$ and Stoneley slowness $\Delta t_{St}$ required for inclusion in equation (3).

Figure 7:
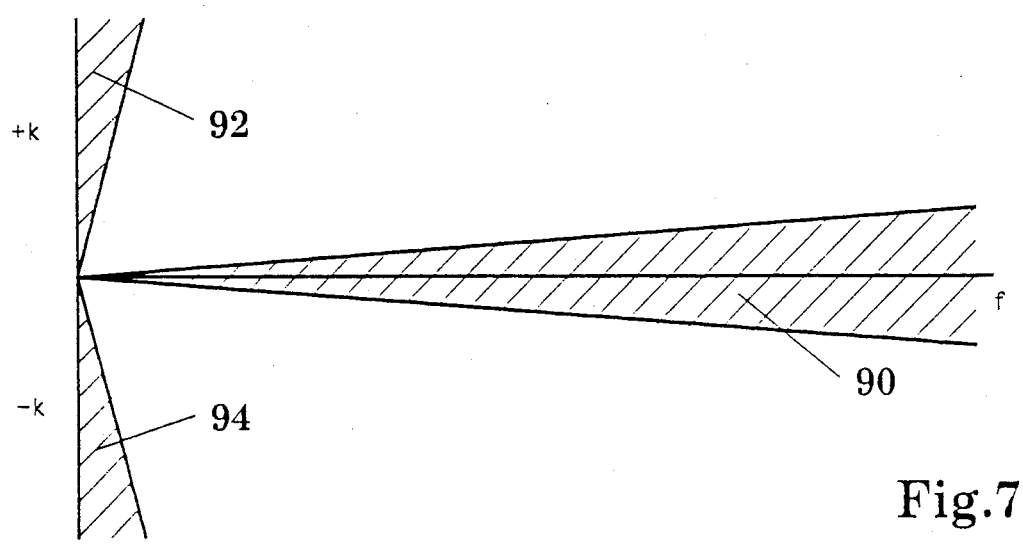
FIG. 7 is a graph showing a velocity filter characteristic in the frequency-wavenumber domain.

A filter is applied to the recorded waveforms at step 104 in order to suppress components corresponding to tube waves. In addition, if the duration of the waveform acquisition time is insufficient to avoid the presence of direct arrivals in the waveforms, a velocity filter is preferably applied at step 104 in order to suppress these direct arrivals. In this latter case, a single velocity filtering operation may be used to perform both filtering functions. FIG. 7 illustrates the desired characteristic of a suitable velocity filter. Referring to FIG. 7, the filter characteristic is shown in the frequency-wavenumber domain, corresponding to a double Fourier transformation of the original waveform data. The filter is arranged to suppress components in regions of the frequency-wavenumber domain shown hatched in FIG. 7, comprising: a narrow fan-shaped region 90 extending symmetrically either side of the frequency axis and increasing in width (wavenumber range) with increasing frequency; and two symmetrical fan-shaped regions 92 and 94 extending up and down the wavenumber axis, increasing in width (frequency range) with increasing wavenumber.

After filtering the analysis proceeds to step 106 where the size of the grids 50 and 60 and the density of points within the grids are selected in accordance within the criteria discussed earlier. At step 108 the length of the sonic energy propagation path from the source 30 to each detector 32 is calculated for each grid point in the grids 50 and 60. The correction factor $W(\alpha_1, \alpha_2, \gamma)$ is calculated for each propagation path at each grid point at step 110. Likewise at step 112 the correction factors $C(\alpha_1)$ and $C(\alpha_2)$ related to the angles of propagation and incidence are calculated. The values calculated for each grid point and each propagation path at steps 108, 110 and 112 are combined with the individual path lengths $D_1$ and $D_2$ at step 114 to compute an overall compensation and distance factor for each propagation path and each grid point as explained with reference to equation (2), that is in accordance with $$W(\alpha_1,\alpha_2,\gamma)D_1D_2C(\alpha_1)C(\alpha_2)$$

These compensation and distance factors for the different propagation paths to each detector 32 via a particular grid point are stored in the corresponding location for that detector and grid point in the matrix 80 (which may conveniently be implemented in a computer program by means of a three-dimensional numeric array).

The values (numeric array contents) for all points in the up and down grids 50 and 60 are initialized by setting these values to zero at step 116. A depth counter d is likewise set to an initial value equal to the maximum depth at which waveforms were recorded, at step 118.

A series of nested loops is then entered at step 120 where a row counter R is set equal to one. A column counter C is likewise set equal to one at step 122, and a receiver index Rx is set equal to one at step 124. At step 126 the down grid 60 is selected for processing. For each combination of a point R,C in this grid 60 and a detector 32, the appropriate compensation and distance factor is selected from the matrix 80 at step 128 and multiplied by the local slowness value S obtained at step 102, in order to obtain a value Δt for the sonic travel time from the source 30 to that detector 32.

At step 130 the amplitude A at time Δt (after operation of the source 30) of the waveform recorded by the relevant detector 32 at depth d is extracted. Since the recorded data comprises the amplitudes of successive samples of the waveforms, it is possible that the time Δt will not exactly coincide with the time of occurrence of one of the recorded samples. In this case the amplitude of the sample recorded at a time closest to the time Δt may be used; alternatively the amplitude A for the time Δt may be obtained by interpolation between the amplitudes for the samples recorded immediately before and after the time Δt.

This amplitude A is cumulated with the existing running total for the grid point R,C at step 132. At step 134 a test is performed to determine whether the up grid 50 has yet been processed. If not the procedure returns via step 136 where the up grid 50 is selected, and steps 128 to 132 are repeated for the same grid point R,C and detector 32 in the up grid 50.

Thereafter the test at step 134 permits the process to continue to step 138 where the counter Rx is incremented. The counter Rx is then tested at step 140 to determine whether amplitudes have been extracted and cumulated for all waveforms (detectors) for a particular grid point. If not the procedure returns to step 126 to repeat the extraction and cumulation for the next detector in the array.

If amplitudes have been extracted from all waveforms for a particular grid point, the counter C is incremented at step 142 and tested at step 144 to determine whether every grid point in the current row has been processed. If not the procedure returns via a connector X to step 124 to cumulate amplitudes for the next grid point in the row and for all detectors 32. When all grid points in a row have been thus processed, the procedure continues to step 146 where the row counter R is incremented. This counter R is tested at step 148 to determine whether all rows have been processed. If not the procedure returns via a connector Y to step 122 in order to commence processing for the first grid point in the next row.

Ultimately the procedure reaches step 150 when processing will have been completed for every grid point in the grids 50 and 60. At step 150 the values for the points in the bottom row $R_{max}$ (row 8 in FIG. 2) of each grid 50 and 60 are output and recorded. These output values are also used to control the grey-scale shading or density of corresponding points plotted across a strip chart by a plotter, which is arranged to advance the chart by one line for each row of grid point values to produce a visual image.

Thereafter the value for each grid point in the grids 50 and 60 is assigned to the corresponding point in the next row down (effectively moving the grids 50 and 60 up by one depth increment, corresponding to the upward movement of the tool 10 during logging), and the values for the grid points in the first row of each grid are reset to zero at step 154. At step 156 the depth counter d is decremented, and then tested at step 158 to determine whether the waveforms for the minimum depth have yet been processed. If not the procedure returns via a connector Z to step 120 to repeat the entire cumulation process for the waveforms recorded at the next depth d in the interval. The values output at step 150 for this next set of waveforms are plotted along a line adjacent the line of points for the previous set of waveforms, so that as each successive line of points is plotted a two-dimensional image is assembled on the paper chart. When the waveforms for all depths have been processed the process terminates at step 160.

Figure 8:
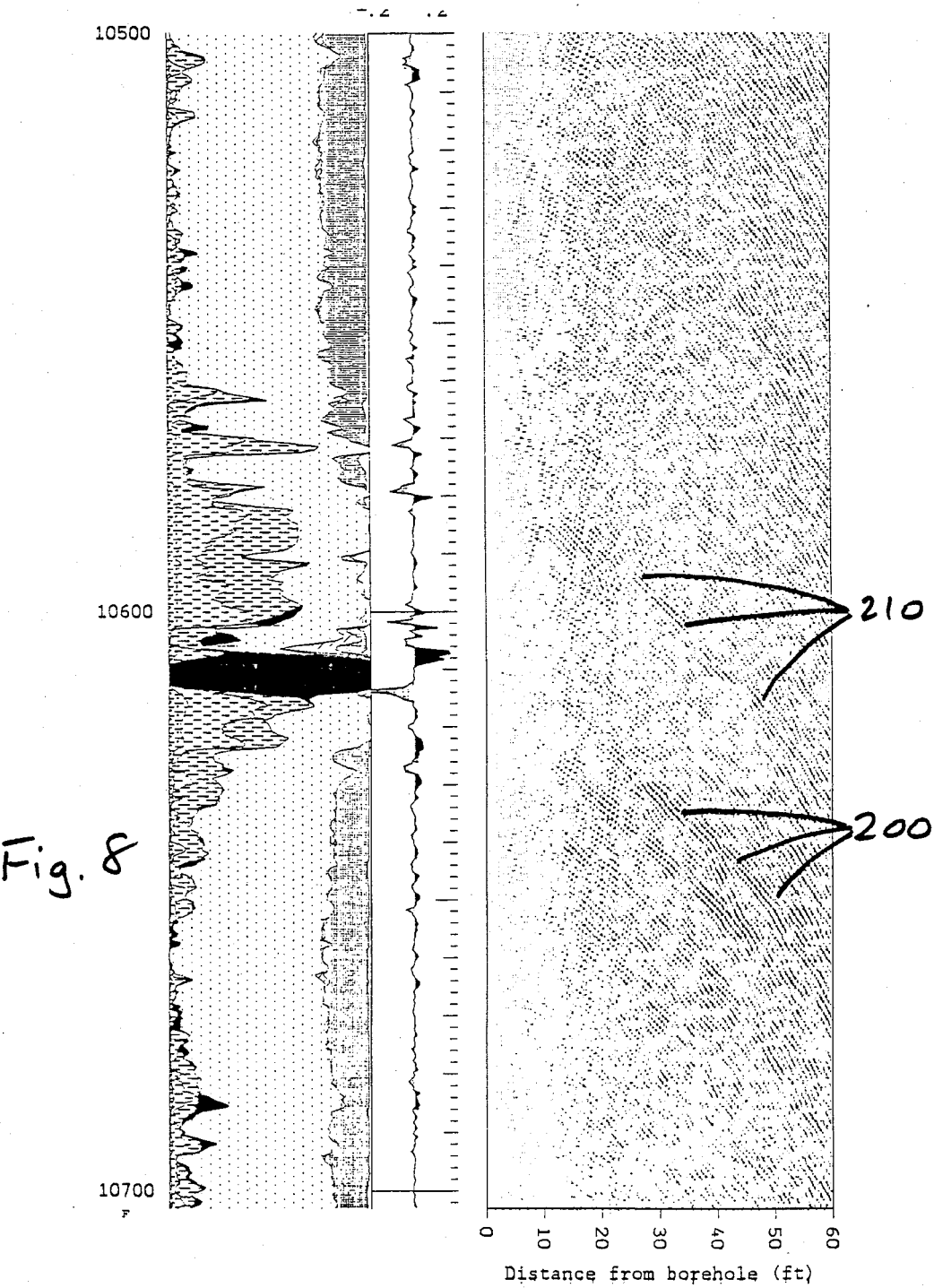
FIG. 8 shows an exemplary image produced in accordance with this invention.

FIG. 8 shows an image produced using the procedure described above with reference to FIGS. 6a to 6c. Inclined features are clearly visible at 200, corresponding to a coal seam known to intersect the borehole just below 10,600 feet. Another inclined feature is visible at 210, corresponding to a bed boundary at 10,580 feet.

There has been described and illustrated herein a method in accordance with the present invention for detection and imaging of formation structural features. While particular embodiments of the invention have been described, it is not intended that the invention be limited thereby. Thus, for example, the specific embodiment has been described in terms of fixed values for the slowness parameters incorporated in equation (3). If desired these parameters may be allowed to vary with depth, so that the associated coupling factors $C(\alpha_1)$ and $C(\alpha_2)$ also vary with depth. The direction of dip of the features imaged in the output from the grids 50 and 60 depends upon which of the source 30 and the array of detectors 32 is above the other. The downward direction of transfer of values in the grids 50 and 60 after all waveforms and grid points have been processed for one position of the tool 10, and the choice of the bottom grid rows for output of cumulated values, are merely convenient choices related to the sequential acquisition of waveforms during upward movement of the tool 10. Therefore it will be apparent to those skilled in the art that various changes and modifications may be made to the invention as described without departing from the spirit and scope of the appended claims.

We claim:

1. The method of imaging features of a formation in the vicinity of a borehole, using a sonic device located in the borehole traversing the formation, the device having a sonic source and a plurality of spaced sonic detectors, said method comprising the steps of:
    (a) establishing a first and a second matrix representative of geometric locations in the formation in the vicinity of the borehole, said first matrix longitudinally offset from said second matrix, each of said matrices having a plurality of rows and columns, the rows of the first and second matrices referenced, from top to bottom relative to the borehole, as $r_1, \ldots, r_m$ and $r_1, \ldots, r_n$, respectively, each (r,c) value constituting a matrix point;
    (b) determining the distance from the sonic source to each matrix point to each detector for each matrix point;
    (c) positioning the sonic device in a first predetermined location;
    (d) deriving a value for each matrix point subsequent to firing the source at the first predetermined location based on the arrival of waveforms at each detector, said waveforms based on slowness of the sonic energy and the length of the path traversed by the energy from the source to the detectors via each matrix point;
    (e) storing said derived value for each matrix point;
    (f) moving the sonic device a predetermined distance, said predetermined distance being proportional to the distance between the rows;
    (g) storing rows $r_m$ and $r_n$ of the first and second matrix, respectively, said rows being indicative of images in the vicinity of the borehole for depths corresponding to the location of rows $r_m$ and $r_n$ in the formation;

(h) shifting all matrix point values by one row such that row $r_{n-1}$ of the second matrix is row $r_n$, row $r_1$ of the second matrix is row $r_2$, row $r_{m-1}$ of the first matrix is row $r_m$, and row $r_1$ of the first matrix is row $r_2$;

(i) deriving a value for each matrix point subsequent to firing the source at the translocated location based on the arrival of waveforms at each detector, said waveforms based on slowness of the sonic energy and the length of the path traversed by the energy from the source to the detectors via each matrix point;

(j) cumulating said derived value of each matrix point with each respective existing matrix point value; and (k) repeating steps (f) through (j) a plurality of times;

said first matrix being indicative of scattering of sonic energy back from features dipping downward, relative to the borehole, said second matrix being indicative of scattering of sonic energy back from features dipping upward, relative to the borehole.

2. The method of claim 1, said steps of deriving a value for each matrix point for the firing of the source at the first and translocated locations further includes the step of compensating the amplitude values for perturbations arising from geometrical effects across the grid.

3. The method of claim 2, wherein said perturbations include the angle of incidence of the propagation path at the grid point and the angle of scattering back from the grid point.

4. The method of claim 2, wherein said perturbations include the angle of propagation from the source and the angle of incidence at the detector as they affect the coupling of the sonic energy.

5. The method of claim 2, wherein said perturbations include geometric spreading losses.

6. The method of claim 1, wherein row $r_1$ of said second matrix corresponds to a location between the sonic source and the sionic detectors.

7. The method of claim 1, wherein row $r_m$ of said first matrix corresponds to a location between the sonic source and the sonic detectors.

8. The method of claim 1, wherein, in step (f), said predetermined distance is substantially equal to the distance between adjacent rows.

9. The method of claim 1, wherein m equals n.

10. The method of claim 1, further including the step of initializing row $r_1$ of the first and second matrices to a predetermined value.

11. The method of claim 10, wherein said predetermined value is substantially equal to zero.

12. The method of imaging features of a formation in the vicinity of a borehole, using a sonic device located in the borehole traversing the formation, the device having a sonic source and a plurality of spaced sonic detectors, said method comprising the steps of:

(a) establishing a first and a second set of points representative of geometric locations in the formation in the vicinity of the borehole, said first set of points longitudinally offset from said second set of points;

(b) determining the distance from the sonic source to each point to each detector for each point;

(c) positioning the sonic device in a first predetermined location;

(d) deriving a value for each point subsequent to firing the source at the first predetermined location based on the arrival of waveforms at each detector, said waveforms based on slowness of the sonic energy and the length of the path traversed by the energy from the source to the detectors via each point;

(e) moving the sonic device a predetermined distance;

(f) deriving a subsequent value for each point subsequent to firing the source at the translocated location based on the arrival of waveforms at each detector, said waveforms based on slowness of the sonic energy and the length of the path traversed by the energy from the source to the detectors via each point;

(g) cumulating said subsequently derived value with each previously derived value for each point; and (h) repeating steps (e) through (g) a plurality of times;

said first set of points being indicative of scattering of sonic energy back from features dipping downward, relative to the borehole, said second set of points being indicative of scattering of sonic energy back from features dipping upward, relative to the borehole.

13. The method of claim 12, said steps (d) and (f) of deriving a value for each point for the firing of the source at the first and translocated locations further includes the step of compensating the amplitude values for perturbations arising from geometrical effects across the grid.

14. The method of claim 13, wherein said perturbations include the angle of incidence of the propagation path at the grid point and the angle of scattering back from the grid point.

15. The method of claim 13, wherein said perturbations include the angle of propagation from the source and the angle of incidence at the detector as they affect the coupling of the sonic energy.

16. The method of claim 13, wherein said perturbations include geometric spreading losses.

* * * * *